United States Patent
Jaradi et al.

(10) Patent No.: US 11,702,023 B2
(45) Date of Patent: Jul. 18, 2023

(54) DEPLOYABLE PLATE FOR REARWARD-FACING SEAT

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 232 days.

(21) Appl. No.: 17/123,439

(22) Filed: Dec. 16, 2020

(65) Prior Publication Data
US 2022/0185216 A1 Jun. 16, 2022

(51) Int. Cl.
| B60R 21/02 | (2006.01) |
| B60K 37/00 | (2006.01) |
| B60N 2/14 | (2006.01) |
| B60R 21/015 | (2006.01) |
| B60R 21/0136 | (2006.01) |

(52) U.S. Cl.
CPC .............. *B60R 21/02* (2013.01); *B60K 37/00* (2013.01); *B60N 2/14* (2013.01); *B60N 2/143* (2013.01); *B60K 2370/63* (2019.05); *B60K 2370/65* (2019.05); *B60K 2370/68* (2019.05); *B60R 21/0136* (2013.01); *B60R 21/01554* (2014.10); *B60R 2021/0273* (2013.01); *B60R 2021/0293* (2013.01)

(58) Field of Classification Search
CPC ... B60R 21/02; B60R 21/045; B60R 21/0136; B60R 21/015; B60R 21/01554; B60R 2021/0273; B60R 2021/0293; B60K 37/00; B60K 2370/65; B60K 2370/68; B60K 2370/60; B60K 2370/63; B60K 2370/688; B60K 2370/87; B60N 2/14; B60N 2/143; B60N 2/42; B60N 2/4221
USPC .................................. 280/748, 753; 180/274
See application file for complete search history.

(56) References Cited

U.S. PATENT DOCUMENTS

| 6,910,714 | B2 | 6/2005 | Browne et al. | |
| 7,478,833 | B2 | 1/2009 | Morris et al. | |
| 7,866,695 | B2 | 1/2011 | Baumann | |
| 10,752,199 | B2 | 8/2020 | Chen et al. | |
| 2007/0068721 | A1* | 3/2007 | Browne .................. | B60R 21/38 180/274 |

* cited by examiner

*Primary Examiner* — Keith J Frisby
(74) *Attorney, Agent, or Firm* — Frank A. MacKenzie; Bejin Bieneman PLC

(57) ABSTRACT

An assembly of a dash for a vehicle includes a first plate and a second plate movable along an axis away from the first plate. The second plate moves from an undeployed position to a deployed position. The assembly includes a spring between the first plate and the second plate that biases the second plate toward the deployed position. The assembly includes a post extending along the axis from the second plate through the first plate. The assembly includes a pin releasably engaging the post with the first plate in the undeployed position. The assembly includes a release supported by the first plate and connected to the pin. The pin is disengageable from the post transverse to the axis by the release.

20 Claims, 8 Drawing Sheets

DEPLOYABLE PLATE FOR REARWARD-FACING SEAT

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions.

DETAILED DESCRIPTION

Figure 1:
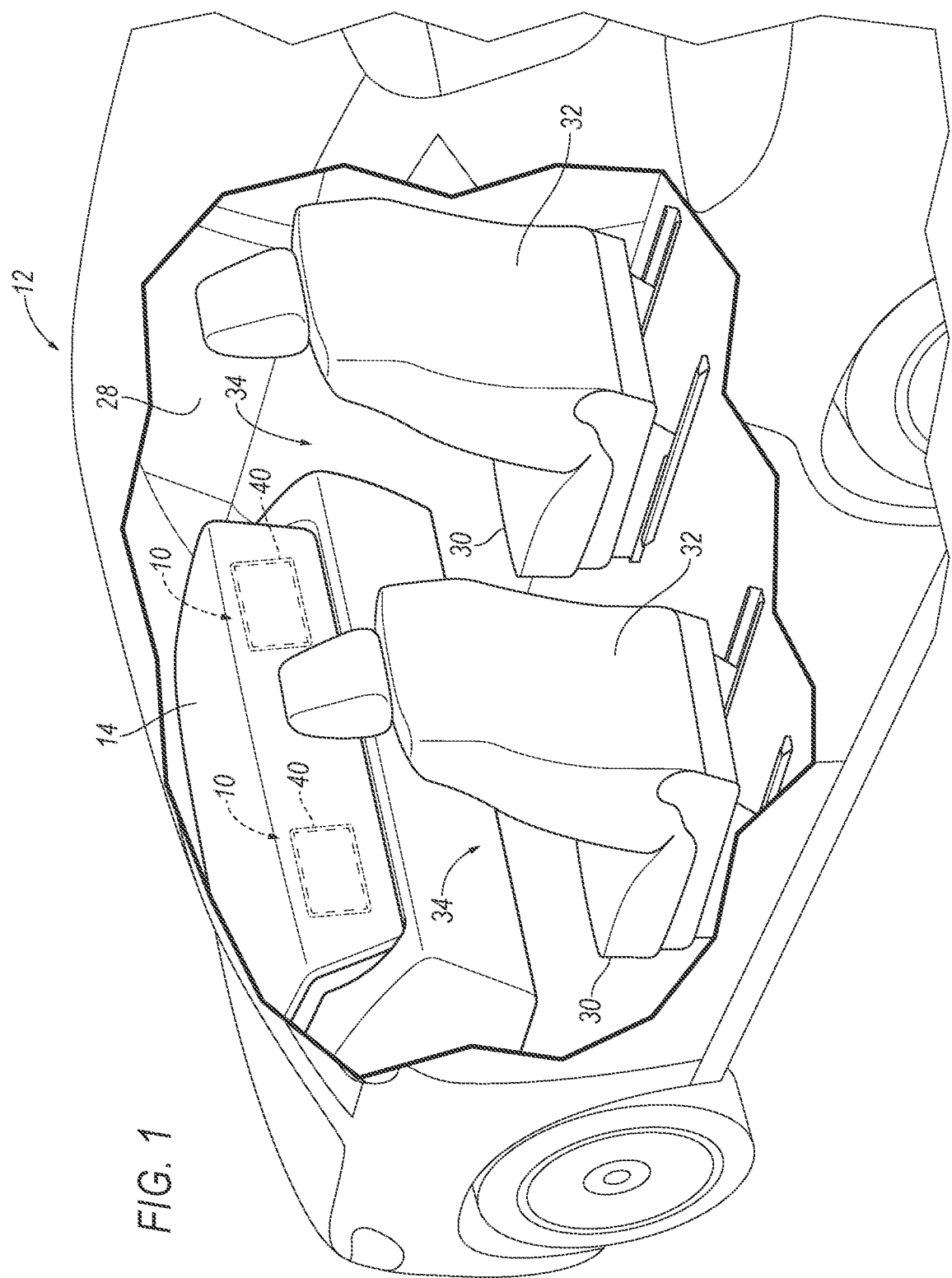
FIG. 1 is a perspective view of a vehicle having a pair of assemblies supported by a dash in an undeployed position.

A vehicle includes a first plate fixed to the dash, a second plate movable along an axis away from the first plate from an undeployed position to a deployed position, a spring between the first plate and the second plate and biasing the second plate toward the deployed position, a post extending along the axis from the second plate through the first plate, a pin releasably engaging the post with the first plate in the undeployed position, and a release supported by the first plate and connected to the pin, the pin being disengageable from the post transverse to the axis by the release.

The release may include a cap that is spring-loaded and connected to the pin, the cap being rotatable relative to the first plate.

The release may include a cable extending from the cap to the pin.

The release may include a solenoid releasably engageable with the cap.

The release may include a cap connected to the pin and a pyrotechnic device engaged with the cap and designed to rotate the cap.

The vehicle may include a second post spaced from the post, the second post extending along the axis from the second plate through the first plate, and a second pin releasably engaging the second post with the first plate in the undeployed position, the second pin being disengageable from the second post transverse to the axis by the release.

The vehicle may include a second spring between the first plate and the second plate and spaced from the spring, the second spring biasing the second plate toward the deployed position.

The first plate may be between the pin and the second plate in the undeployed position.

The vehicle may include a cable extending from the release to the pin, the cable being movable by the release.

The pin may abut the first plate in the undeployed position.

The vehicle may include a seat movable from a forward-facing position to a rearward-facing position, the seat including a seatback defining an occupant seating area of the seat, the seatback being between the second plate and the occupant seating area when the seat is in the rearward-facing position.

An assembly includes a first plate, a second plate movable along an axis away from the first plate from an undeployed position to a deployed position, a spring between the first plate and the second plate and biasing the second plate toward the deployed position, a post extending along the axis from the second plate through the first plate, a pin releasably engaging the post with the first plate in the undeployed position, and a release supported by the first plate and connected to the pin, the pin being disengageable from the post transverse to the axis by the release.

The release may include a cap that is spring-loaded and connected to the pin, the cap being rotatable relative to the first plate.

The release may include a cable extending from the cap to the pin.

The release may include a solenoid releasably engageable with the cap.

The release may include a cap connected to the pin and a pyrotechnic device engaged with the cap and designed to rotate the cap.

The assembly may include a second post spaced from the post, the second post extending along the axis from the second plate through the first plate, and a second pin releasably engaging the second post with the first plate in the undeployed position, the second pin being disengageable from the second post transverse to the axis by the release.

The assembly may include a second spring between the first plate and the second plate and spaced from the spring, the second spring biasing the second plate toward the deployed position.

The first plate may be between the pin and the second plate in the undeployed position.

The pin may abut the first plate in the undeployed position.

With reference to the Figures, wherein like numerals indicate like parts throughout the several views, an assembly 10 of a dash 14 of a vehicle 12 is generally shown. The assembly 10 includes a first plate 16 and a second plate 18 movable along an axis A away from the first plate 16. The second plate 18 moves from an undeployed position (FIGS. 1, 3, and 5) to a deployed position (FIGS. 2 and 4). The assembly 10 includes a spring 20 between the first plate 16 and the second plate 18 that biases the second plate 18 toward the deployed position. The assembly 10 includes a post 22 extending along the axis A from the second plate 18 through the first plate 16. The assembly 10 includes a pin 24 releasably engaging the post 22 with the first plate 16 in the undeployed position. The assembly 10 includes a release 26 supported by the first plate 16 and connected to the pin 24. The pin 24 is disengageable from the post 22 transverse to the axis A by the release 26.

In the event of an impact to the vehicle 12, the second plate 18 moves to the deployed position to absorb energy when the second plate 18 is impacted, e.g., a seatback 32 of a seat 30 impacting the second plate 18 when the seat 30 is in a rearward-facing position. Specifically, the release 26 disengages the pin 24 from the post 22 to allow the second plate 18 to move from the undeployed position and away from the first plate 16 to the deployed position. In the undeployed position, the spring 20 is compressed between the first plate 16 and the second plate 18. As the second plate 18 moves toward the deployed position, the spring 20 extends and moves the second plate 18 to the deployed position. The spring 20 provides energy absorption when the second plate 18 is impacted.

Figure 6:
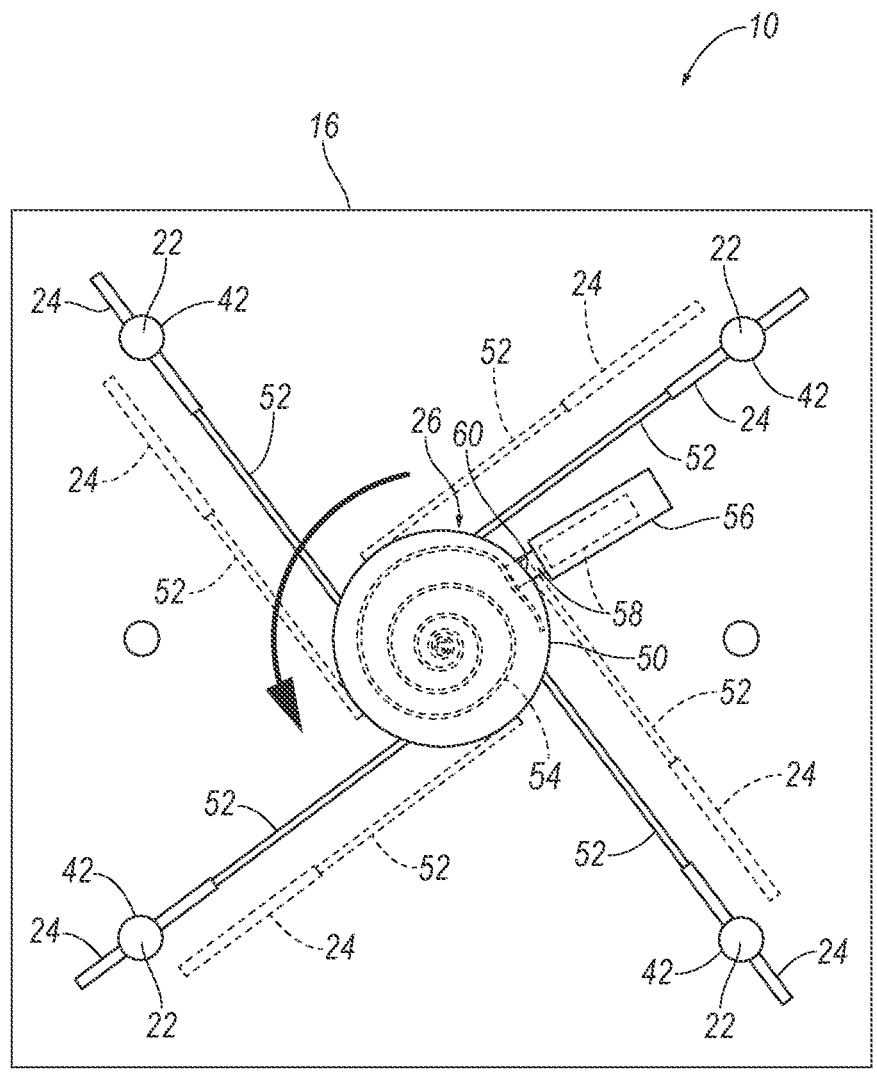
FIG. 6 is a rear view of a first embodiment of the assembly having a release including a cap that is spring-loaded.
Figure 7:
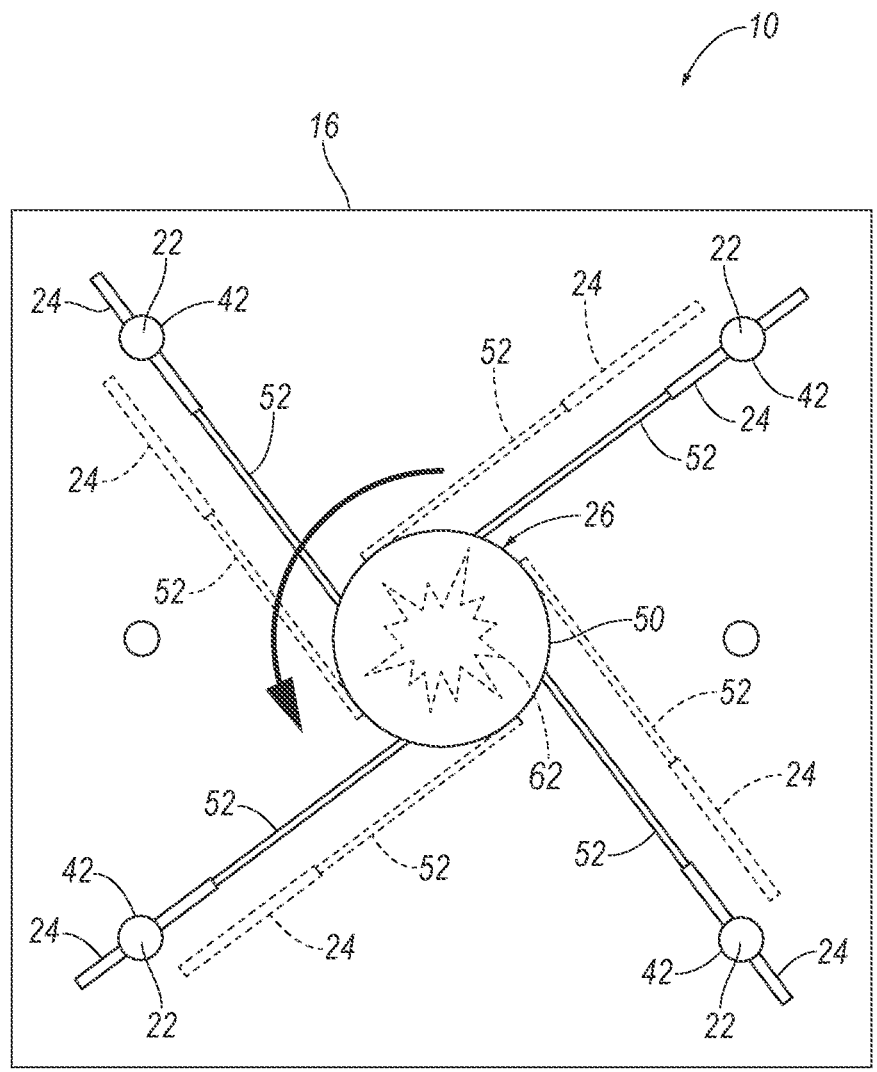
FIG. 7 is a rear view of a second embodiment of the assembly having a release including a pyrotechnic device.

Two example embodiments of the assembly 10 are shown in FIGS. 6 and 7, respectively, to release 26 the second plate 18 to the deployed position. In the embodiment of the assembly 10 shown in FIG. 6, the release 26 includes a cap 50 that is spring-loaded with a solenoid 56 that is releasably engageable with the cap 50 to allow the cap 50 to rotate. In the second embodiment of the assembly 10 shown in FIG. 7, a pyrotechnic device 62 is engaged with the cap 50 and is designed to rotate the cap 50. In both embodiments, the rotation of the cap 50 disengages the pin 24 from the post 22 to allow the spring 20 to move the second plate 18 to the deployed position. Common numerals are used to identify common features in the example embodiments.

Figure 2:
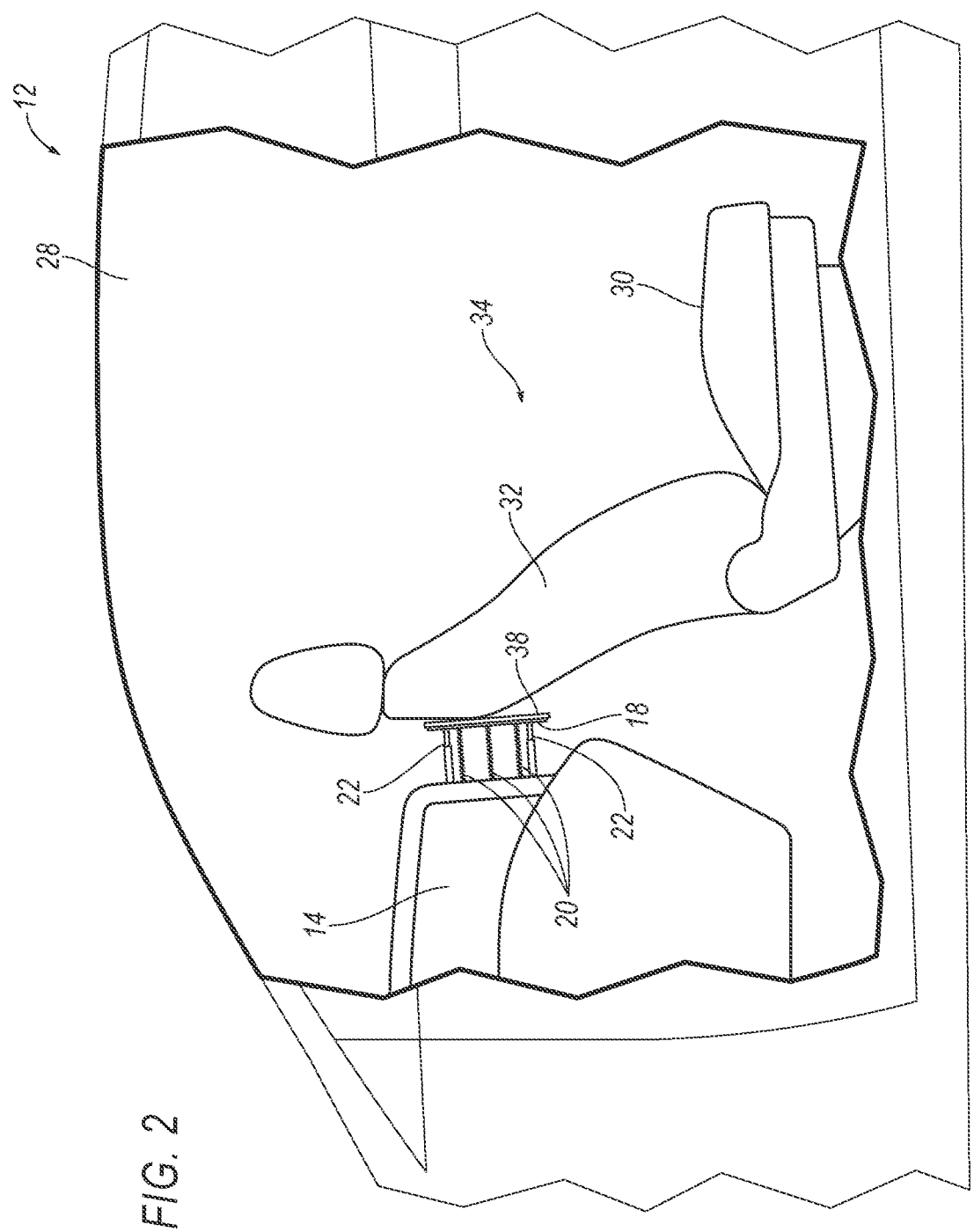
FIG. 2 is a side view of the vehicle having a seat in a rearward-facing position with the seat abutting the assembly in a deployed position.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a passenger compartment 28 to house occupants, if any, of the vehicle 12. The passenger compartment 28 may extend across the vehicle 12, i.e., from one side to the other side of the vehicle 12. The passenger compartment 28 includes a front end and a rear end with the front end being in front of the rear end during forward movement of the vehicle.

With continued reference to FIG. 1, the vehicle 12 includes at least one dash 14. In the example shown in the Figures, the vehicle 12 includes one dash 14 at the front end of the passenger compartment 28. In addition or in the alternative, the vehicle 12 may include another dash 14 at the rear end of the passenger compartment 28. The dash 14 may also be called a bulkhead or an instrument panel.

The dash 14 may be a structural member of a frame of the vehicle 12, i.e., a portion of the frame that resists static and dynamic forces from operation of the vehicle 12 without undue deflection or distortion. Examples of forces include a weight of other vehicle components, passengers, and cargo; twisting forces caused by driving over uneven surfaces; torque from a transmission; longitudinal and lateral forces from driving; and possibly forces from impacts with other vehicles or impactors.

The dash 14 may include vehicle controls, such as gauges, dials, screens, and information displays; heating and ventilation equipment; a radio and other electronics; etc. The dash 14, as well as the rest of the vehicle 12, may lack a steering wheel and may lack pedals for accelerating and braking. In other words, no steering wheel or pedals for accelerating and braking are supported by or adjacent to the dash 14. More specifically, the vehicle 12 does not include a steering wheel or pedals for accelerating and braking, e.g., is an autonomous vehicle 12.

The dash 14 may extend from one side of the vehicle 12 to the other side of the vehicle 12, i.e., across the passenger compartment 28 in the cross-vehicle direction. For example, the dash 14 may extend from one body pillar to another body pillar. The dash 14 may extend downwardly from a windshield. For example, the dash 14 may extend from the windshield to a floor of the vehicle 12.

The dash 14 may be in front of seats 30, e.g., at the front end of the passenger compartment 28, as shown in FIG. 1. In such an example, the dash 14 faces the seats 30. The dash 14 may, for example, include a class-A surface, i.e., a surface specifically manufactured to have a high quality, finished aesthetic appearance free from blemishes.

The dash 14 may, for example, be flat in the cross-vehicle direction, as shown in FIG. 1. In other words, the dash 14 may be generally planar. Specifically, the vehicle-rearward face may be flat.

With continued reference to FIG. 1, the vehicle 12 may include one or more seats 30. Specifically, the vehicle 12 may include any suitable number of seats 30. As shown in FIGS. 1 and 2, the seats 30 are supported by the vehicle floor. The seat 30 may be arranged in any suitable arrangement in the passenger compartment 28. As in the example shown in the Figures, one or more of the seats 30 may be at the front end of the passenger compartment 28, e.g., a driver seat assembly and/or a passenger seat assembly. In other examples, one or more of the seats 30 may be behind the front end of the passenger compartment 28, e.g., at the rear end of the passenger compartment 28. The seat 30 may be movable relative to the vehicle floor to various positions, e.g., movable fore-and-aft and/or cross-vehicle. The seat 30 may be of any suitable type, e.g., a bucket seat.

The seat 30 includes the seatback 32 and a seat bottom (not numbered). The seatback 32 may be supported by the seat bottom and may be stationary or movable relative to the seat bottom. The seatback 32 and the seat bottom may be adjustable in multiple degrees of freedom. Specifically, the seatback 32 and the seat bottom may themselves be adjustable. In other words, adjustable components within the seatback 32 and/or the seat bottom, and/or may be adjustable relative to each other.

Each seat 30 may rotate about a vertical axis (not numbered) that extends through the vehicle roof and the vehicle floor. For example, the seats 30 may rotate between a forward-facing position and a rearward-facing position. In the forward-facing position, an occupant of the seat 30 faces the front end of the passenger compartment 28. In the rearward-facing position, an occupant of the seat 30 faces the rear end of the passenger compartment 28. The seats 30 may rotate completely, i.e., 360°, about the vertical axis. The seats 30 may rotate between fixed positions, e.g., the forward-facing position and the rearward-facing position, or may be rotatable to an infinite number of positions.

The seatback 32 defines an occupant seating area 34 of the seat 30. The occupant seating area 34 is the area occupied by an occupant when seated on the seat bottom. The occupant seating area 34 is in a seat-forward direction of the seatback 32 and above the seat bottom. In the example shown in the figures, the occupant seating area 34 faces the front end of the passenger compartment 28 when the seat 30 is in the forward-facing position and the occupant seating area 34 faces the rear end of the passenger compartment 28 when the seat 30 is in the rearward-facing position.

The assembly 10 is supported by the dash 14. The assembly 10 may be supported by components of the dash 14, e.g., a cross-car beam 36 extending from one side of the vehicle 12 to the other side of the vehicle 12. The vehicle 12 may include any suitable number of assemblies 10. In the example shown in FIG. 1, the vehicle 12 includes two assemblies 10, one assembly 10 in front of each of the front seats 30 of the vehicle 12. Similarly, the vehicle 12 may include assemblies 10 behind a rear seat 30 of the vehicle 12.

Figure 3:
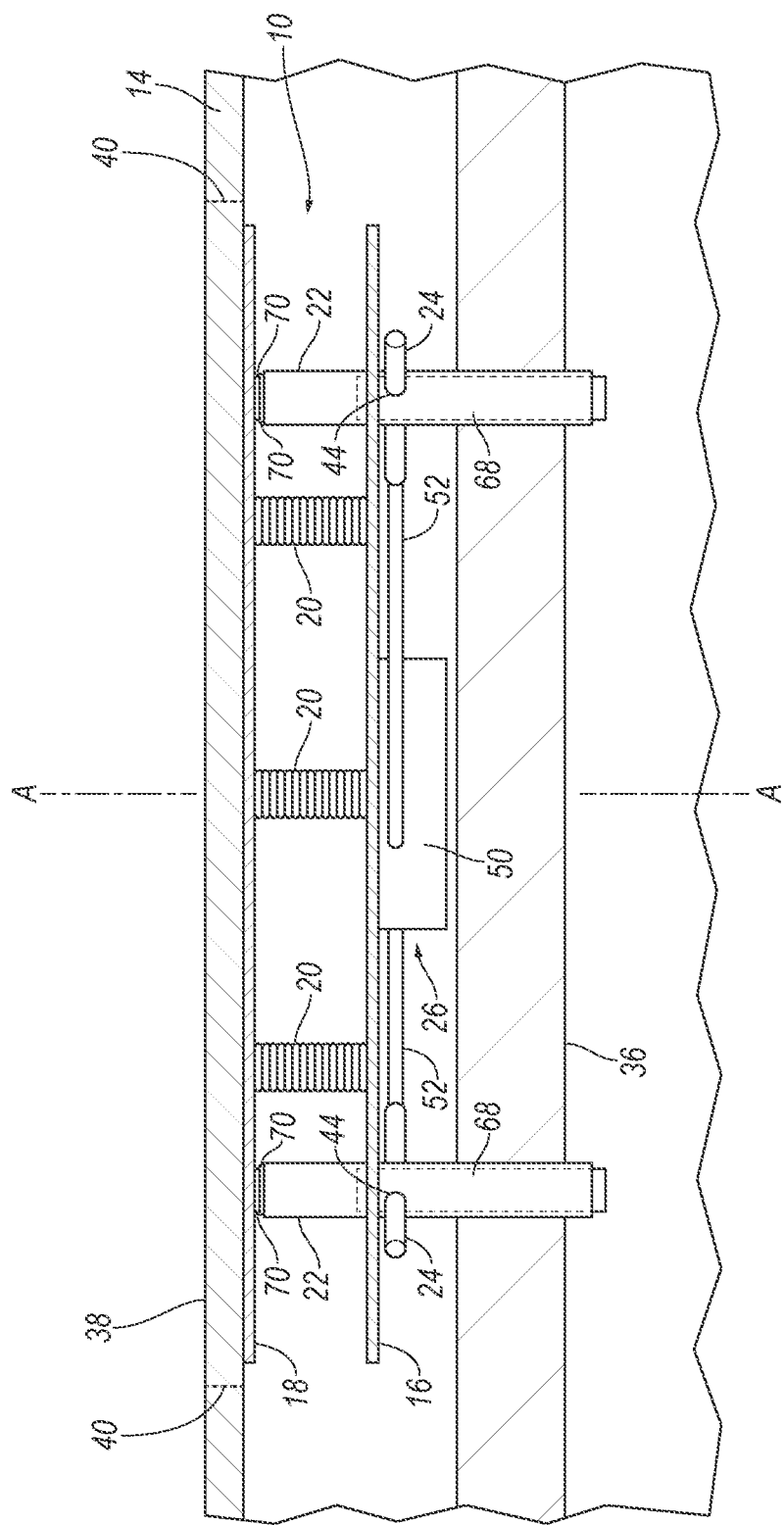
FIG. 3 is a top cut away view of the assembly supported by the dash in the undeployed position.
Figure 4:
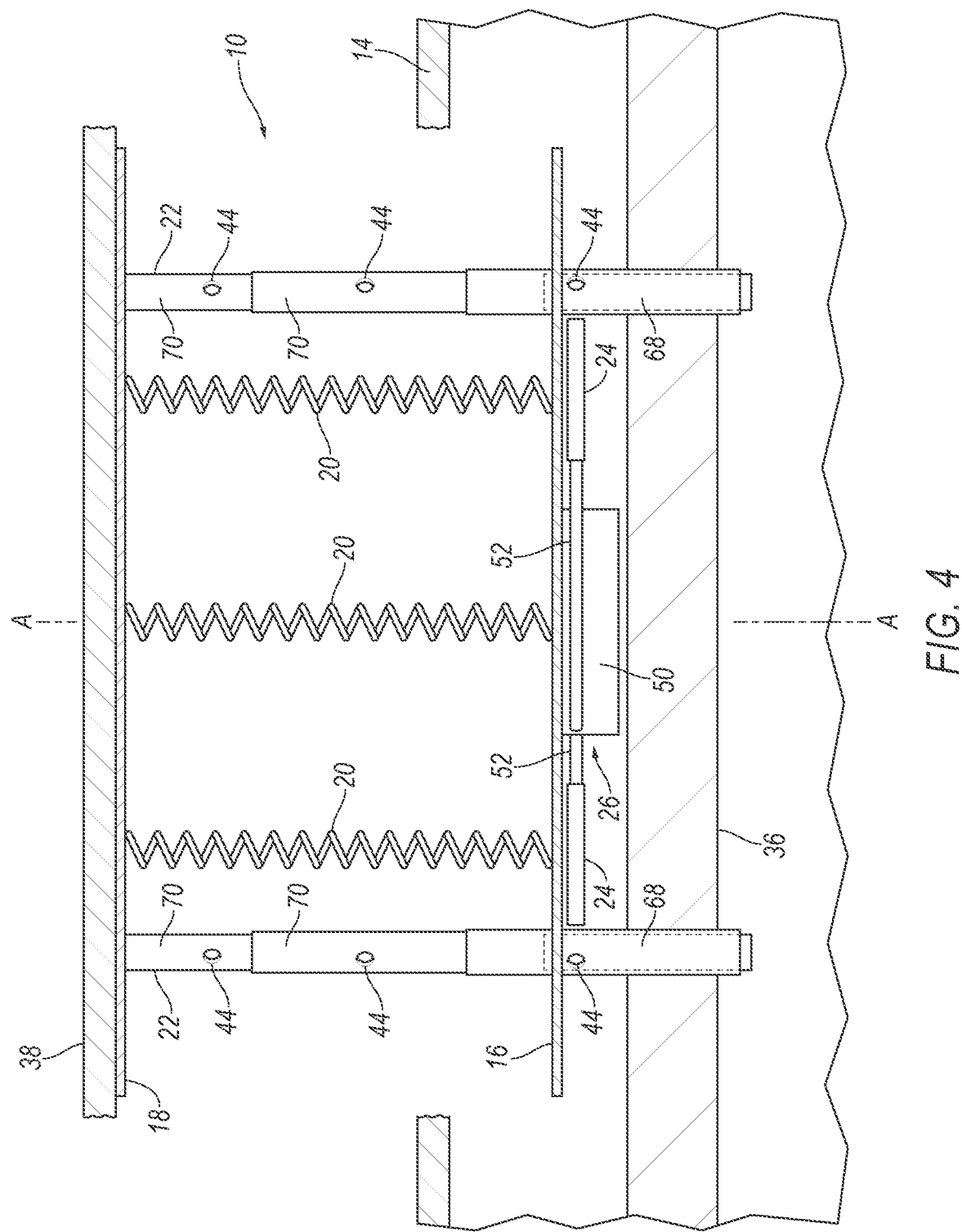
FIG. 4 is a top cut away view of the assembly supported by the instrument panel in the deployed position.
Figure 5:
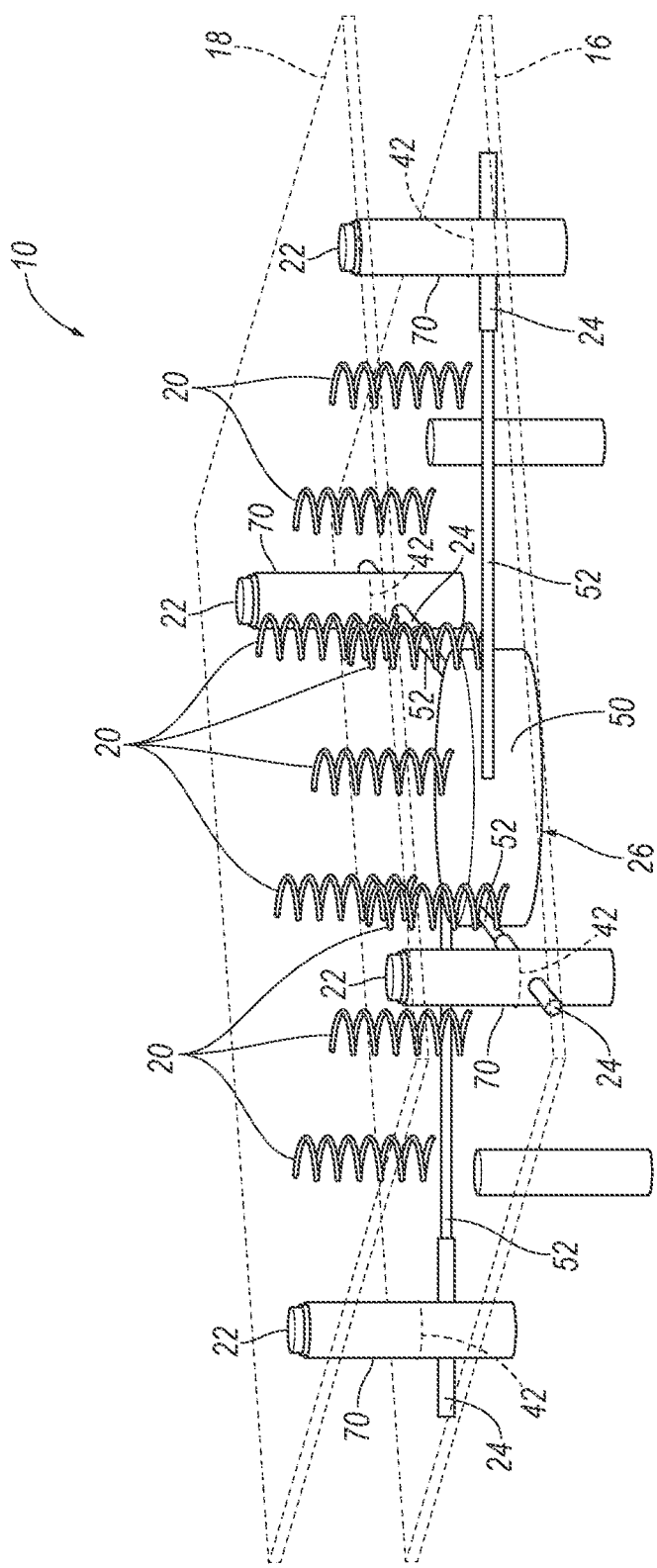
FIG. 5 is a perspective view of the assembly in the undeployed position.

With reference to FIGS. 3-5, the assembly 10 includes the first plate 16 and the second plate 18. The first plate 16 is fixed to the dash 14, e.g., the cross-car beam 36. The first plate 16 may be fixed in any suitable manner, e.g., bolts, fasteners, welding, etc. In the example shown in the Figures, the first plate 16 is fixed in two fixed locations spaced from each other along the cross-car beam 36. As the second plate 18 moves from the undeployed position to the deployed position, the first plate 16 remains stationary and fixed to the dash 14, e.g., the cross-car beam 36. The first plate 16 and the second plate 18 may be rigid. The first plate 16 and the second plate 18 may be, for example, plastic or metal.

The second plate 18 is supported by the first plate 16. The second plate 18 may be generally parallel with the first plate 16 both in the undeployed position and the deployed position. The second plate 18 is movable from the undeployed position to the deployed position away from the first plate 16. Specifically, the second plate 18 may be movable away from the dash 14, e.g., the cross-car beam 36, along the axis A to the deployed position. The axis A extends longitudinally in the vehicle 12, i.e., from the front end of the passenger compartment 28 to the rear end of the passenger compartment 28 or along a longitudinal axis of the vehicle 12.

With reference to FIGS. 1 and 3, in the undeployed position, the assembly 10 may be concealed inside the dash 14. In other words, a segment 38 of the dash 14 may be between the assembly 10 and the seat 30. Specifically, the dash 14 may be between the second plate 18 and the seatback 32 when the seat 30 is in the rearward-facing position and the second plate 18 is in the undeployed position. The segment 38 of the dash 14 between the assembly 10 and the seat 30 may be adjacent the second plate 18 of the assembly 10 in the undeployed position. As in the example shown in the Figures, the second plate 18 may abut the segment 38 of the dash 14 between the assembly 10 and the seat 30.

The dash 14 may include a tear seam 40 surrounding the segment 38 of the dash 14 between the second plate 18 and the seatback 32. The tear seam 40 may be, for example, a line of decreased material thickness and/or perforations to induce tearing along the tear seam 40 when subjected to sufficient force. When the second plate 18 moves from the undeployed position to the deployed, the tear seams 40 may release 26 to allow the second plate 18 to move to the deployed position. The segment 38 of the dash 14 may remain between the second plate 18 and the seatback 32 in the deployed position, i.e., the segment 38 may be in contact with the seatback 32 when the second plate 18 is in the deployed position. The dash 14 may include any suitable number of tear seams 40, i.e., the number of tear seams 40 may be equal to the number of assemblies 10 in the vehicle 12. In the example shown in the Figures, the vehicle 12 includes two assemblies 10 and two tear seams 40.

The segment 38 of the dash 14 may include the class-A surface of the dash 14 as introduced above. In the alternative to the segment 38, the second plate 18 may be exposed to the passenger compartment 28. In such an example, the second plate 18 may have a class-A surface facing the passenger compartment 28 and/or may be connected to the dash 14 with a tear seam around a periphery of the second plate 18.

In an example such as shown in the Figures, i.e., wherein the seats 30 are front seats 30, the second plate 18 may move to the deployed position when the seat 30 is in the rearward-facing position. Specifically, the seatback 32 is between the second plate 18 and the occupant seating area 34 when the seat 30 is in the rearward-facing position. In the event of an impact to the vehicle 12, the seatback 32 of the seat 30 may contact the dash 14 and, indirectly, the second plate 18 of the assembly 10 in the deployed position. In such an event, the second plate 18 may support the seatback 32 in the deployed position to provide energy absorption to the seatback 32 in the event of an impact to the vehicle 12 when the seat 30 is in the rearward-facing position.

With reference to FIGS. 3-5, the assembly 10 includes the spring 20 between the first plate 16 and the second plate 18. The spring 20 is elongated along the axis A. The spring 20 biases the second plate 18 toward the deployed position, i.e., the spring 20 applies a force on the second plate 18 to move the second plate 18 away from the first plate 16 and toward the deployed position. In the undeployed position, the spring 20 is compressed between the first plate 16 and the second plate 18. In the deployed position, the spring 20 is extended between the first plate 16 and the second plate 18. The compression in the spring 20 is released to apply a force on the second plate 18 to move the second plate 18 from the undeployed position to the deployed position and allow for energy absorption of the seatback 32 in the event of an impact to the vehicle 12.

The assembly 10 may include any suitable number of springs 20 to move the second plate 18 away from the first plate 16 and to the deployed position. In the examples shown in the Figures, the assembly 10 includes nine springs 20. The springs 20 are spaced from each other between the first plate 16 and the second plate 18 in a three by three pattern. The springs 20 are spaced in a manner that the first plate 16 and the second plate 18 remain generally parallel with each other in both the undeployed position and the deployed position.

The assembly 10 includes the post 22 extending from the second plate 18 and through the first plate 16. Specifically, the post 22 extends along the axis A from the second plate 18 through the first plate 16. As shown in the Figures, the post 22 may be telescopic. Specifically, the post 22 extends along the axis A. As an example and as shown in the Figures, the post 22 may include a base 68 fixed to the first plate 16, i.e., extending through the first plate 16, with the plate defining a cavity. The post 22 may include extensions 70 that are received by the cavity when the second plate 18 is in the undeployed position.

The extensions 70 may be slidable relative to each other. The extensions 70 may be sized to be slidable within the base 68, i.e., slidable into the cavity of the base 68. In other words, an outer diameter of the extensions 70 may be smaller than an outer diameter of the cavity, i.e., the base 68. Each of the extensions 70 and the base 68 may include a stop that engages a lip on the other of the extensions 70 or the base 68 to stop relative sliding of the extensions 70. As the second plate 18 moves to the deployed position, the extensions 70 slide relative to each other and away from the first plate 16.

The first plate 16 may define a hole 42 that receives the post 22 when the second plate 18 is in the undeployed position. The posts 22 may be fixed to the second plate 18 in any suitable manner, e.g., welding, fasteners, etc. As shown in the example in the Figures, the post 22 may be fixed in the hole 42 in a suitable manner, e.g., welding, fastener, etc. For example, the base 68 of the post 22 may be fixed to the hole 42.

With continued reference to FIGS. 3-5, the assembly 10 may include any suitable number of posts 22. Each of the posts 22 may be spaced from each of the other of the posts 22. In the examples shown in the Figures, the assembly 10 includes four posts 22 each fixed adjacent each of the corners of the second plate 18. Each of the posts 22 extends from the second plate 18 and through the first plate 16 along the axis A. The first plate 16 may include a number of holes 42 equal to the number of posts 22 in the assembly 10. In the example in the Figures, the first plate 16 includes four holes 42, one hole 42 aligning with each post 22. Each of the posts 22 extends from the second plate 18 and through a corresponding hole 42 in the first plate 16.

The assembly 10 includes the pin 24 releasably engaging the post 22 with the first plate 16 in the undeployed position. The pin 24 retains the second plate 18 in the undeployed position by being engaged with the post 22. Specifically, the pin 24 extends through the post 22 to retain the second plate 18 in the undeployed position. As an example, the post 22 may define an aperture 44 that the pin 24 extends through. The aperture 44 may extend through the base 68 and extensions 70 of the post 22, i.e., each of the extensions 70 and the base 68 may include its own aperture 44. The pin 24 may abut the first plate 16 in the undeployed position to retain the second plate 18 in the undeployed position. In other words, the pin 24 may contact the second plate 18 to retain the second plate 18 in the undeployed position. Specifically, the first plate 16 is between the pin 24 and the second plate 18 in the undeployed position.

The pin 24 is releasable, i.e., the pin 24 may be released from the post 22 to allow the second plate 18 to move from the undeployed position to the deployed position. The pin 24 is disengageable from the post 22 transverse to the axis A by the release 26. In other words, the pin 24 is disengageable from the post 22 in a direction that is diagonal to the axis A. The pin 24 may be removed from the aperture 44 or apertures 44 in the post 22 to disengage the pin 24 with the post 22. When the pin 24 has been disengaged, the post 22 may extend and the second plate 18 may move to the deployed position.

The assembly 10 may include any suitable number of pins 24. Each of the pins 24 may be releasably engaged with a post 22 of the assembly 10. The number of pins 24 is equal to the number of posts 22 in the assembly 10. In the examples shown in the Figures, the assembly 10 includes four pins 24, each pin 24 being releasably engaged with each of the posts 22.

With reference to FIGS. 6 and 7, the release 26 may be supported by the first plate 16. Specifically, the release 26 may be fixed directly to the first plate 16. The release 26 is supported on a side of first plate 16 opposite the second plate 18. As shown in the Figures, the release 26 may be between the cross-car beam 36 and the first plate 16. The release 26 may be activated, e.g., by a vehicle computer 46 and/or impact sensors 48 of the vehicle 12, in the event of an impact to the vehicle 12 to allow the second plate 18 to move from the undeployed position to the deployed position.

As discussed in more detail below, the release 26 is connected to the pin 24 to disengage the pin 24 from the post 22 to allow the second plate 18 to move to the deployed position. Specifically, the release 26 may include a cap 50 supported by the first plate 16 and connected to the pin 24. The cap 50 rotates relative to the first plate 16 to disengage the pin 24 from the post 22.

As discussed above, the release 26 is connected to the pin 24 to disengage the pin 24 from the posts 22. As in the examples shown in the Figures, a cable 52 may extend from the release 26 to the pins 24. Specifically, the cable 52 may extend from the cap 50 to the pin 24. The assembly 10 may include a number of cables 52 equal to the number of pins 24, i.e., a different cable 52 extends from the cap 50 to each of the pins 24. In the examples in the Figures, the assembly 10 includes four cables 52, each cable 52 extending from the cap 50 to each of the pins 24. Each cable 52 may be spaced from each of the other cables 52 around the cap 50 to extend to each of the pins 24. The cables 52 may be connected to the cap 50 in any suitable manner, e.g., welding, fastener, adhesive, etc.

The cables 52 are movable by the release 26 to disengage the pins 24 from the posts 22. Specifically, the cap 50 may be rotatable relative to the first plate 16 to disengage the pins 24 from the posts 22. The rotation of the cap 50 causes the pins 24 to be removed from the posts 22 as the cap 50 rotates relative to the first plate 16. As the cap 50 rotates, the cables 52 are pulled by the cap 50 and the cables 52 disengage the pins 24 from the posts 22. When the pins 24 are disengaged from the posts 22, the posts 22 extend along axis A and the second plate 18 may move away from the first plate 16 and toward the deployed position.

Figure 8:
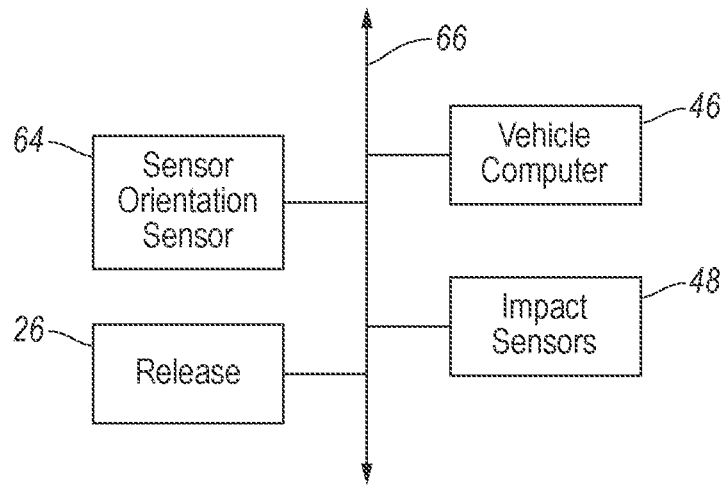
FIG. 8 is a block diagram showing a communication network of the vehicle.

As shown in FIG. 8, the vehicle 12 includes the vehicle computer 46 that includes a processor and a memory such as are known. The memory includes one or more forms of computer readable media, and stores instructions executable by the vehicle computer 46 for performing various operations, including as disclosed herein. The vehicle computer 46 may include programming to operate one or more of vehicle brakes, propulsion (e.g., control of acceleration in the vehicle 12 by controlling one or more of an internal combustion engine, electric motor, hybrid engine, etc.), steering, climate control, interior and/or exterior lights, etc., as well as to determine whether and when the vehicle computer 46, as opposed to a human operator, is to control such operations. Additionally, the vehicle computer 46 may be programmed to determine whether and when a human operator is to control such operations.

The vehicle computer 46 may include or be communicatively coupled to, e.g., via a vehicle network such as a communications bus as described further below, more than one processor, e.g., included in components such as sensors, electronic controller units (ECUs) or the like included in the vehicle 12 for monitoring and/or controlling various vehicle components, e.g., a powertrain controller, a brake controller, a steering controller, etc.

With reference to FIG. 8, the vehicle computer 46 is generally arranged for communications on a vehicle communication network 66 that can include a bus in the vehicle 12 such as a controller area network (CAN) or the like, and/or other wired and/or wireless mechanisms. Via the vehicle network, the vehicle computer 46 may transmit messages to various devices in the vehicle 12 and/or receive messages (e.g., CAN messages) from the various devices, e.g., sensors, an actuator, a human machine interface (HMI), etc. Alternatively or additionally, in cases where the vehicle computer 46 actually comprises a plurality of devices, the vehicle communication network 66 may be used for communications between devices represented as the vehicle computer 46 in this disclosure. Further, as mentioned below, various controllers and/or sensors may provide data to the vehicle computer 46 via the vehicle communication network 66.

The vehicle 12 may include at least one impact sensor 48 for sensing impact of the vehicle 12, and the vehicle computer 46 may be in communication with the impact sensors 48. The impact sensor 48 is configured to detect an impact to the vehicle 12. The impact sensor 48 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 48 may be located at numerous points in or on the vehicle 12.

The vehicle 12 may include seat orientation sensors 64 to determine the orientation of the seat 30 and/or seats 30, i.e., the seat orientation sensors 64 may indicate whether the seats 30 are in the forward-facing position or the rearward-facing position. The seat orientation sensors 64 may be in communication with the vehicle computer 46. The seat orientation sensors 64 may send a signal to the vehicle computer 46 to indicate whether the seat 30 is in the forward-facing position or the rearward-facing position. The vehicle 12 may include any suitable number of seat orientation sensors 64 to determine the orientation of multiple seats 30 in the vehicle 12. In other words, the vehicle 12 may include a number of seat orientation sensors 64 equal to the number of seats 30 that are rotatable in the vehicle 12.

In the example embodiment shown in FIG. 6, the cap 50 may be spring-loaded. In other words, the release 26 may include a spiral spring 54 connected between the cap 50 and the first plate 16, i.e., one end of the spiral spring 54 is connected to the cap 50 and the other end of the spiral spring 54 is connected to the first plate 16. In the undeployed position and when the release 26 is not activated, the spiral spring 54 may be coiled to apply a rotational force on the cap 50.

As shown in FIG. 6, the release 26 may include a solenoid 56 releasably engageable with the cap 50 to retain the rotational force of the spiral spring 54 on the cap 50 until the release 26 is activated. The solenoid 56 may be in communication with the vehicle computer 46. In the event of an impact to the vehicle 12 where the seat 30 is in the rearward-facing position, the vehicle computer 46 may send a signal to the solenoid 56 to release 26 the solenoid 56. The solenoid 56 may include a plunger 58 that is retractable to extend through the cap 50, e.g., through an opening 60 in the cap 50. When the release 26 is activated, the plunger 58 disengages from the cap 50 and the spiral spring 54 is able to uncoil and rotate the cap 50 relative to the first plate 16. As the spiral spring 54 uncoils, the cap 50 rotates and the cables 52 extending to the pins 24 are moved by the cap 50. The pins 24 are disengaged from the posts 22 and the posts 22 pass through the first plate 16 as the second plate 18 moves toward the deployed position.

In the example embodiment shown in FIG. 7, the release 26 may include a pyrotechnic device 62 engaged with the cap 50. The pyrotechnic device 62 may be designed to rotate the cap 50 relative to the first plate 16, i.e., the pyrotechnic device 62 may be a rotary pyrotechnic device 62 to rotate the cap 50 to deploy the second plate 18. In such an example, the pyrotechnic device 62 may be in communication with the vehicle computer 46. In the event of an impact to the vehicle 12 where the seat 30 is in the rearward-facing position, the vehicle computer 46 may send a signal to activate the pyrotechnic device 62. When the pyrotechnic device 62 is activated, the pyrotechnic device 62 causes the cap 50 to rotate relative to the first plate 16. As the cap 50 rotates, the cables 52 extending to the pins 24 are moved by the cap 50. The pins 24 are disengaged from the posts 22 and the posts 22 pass through the first plate 16 as the second plate 18 moves toward the deployed position.

Figure 9:
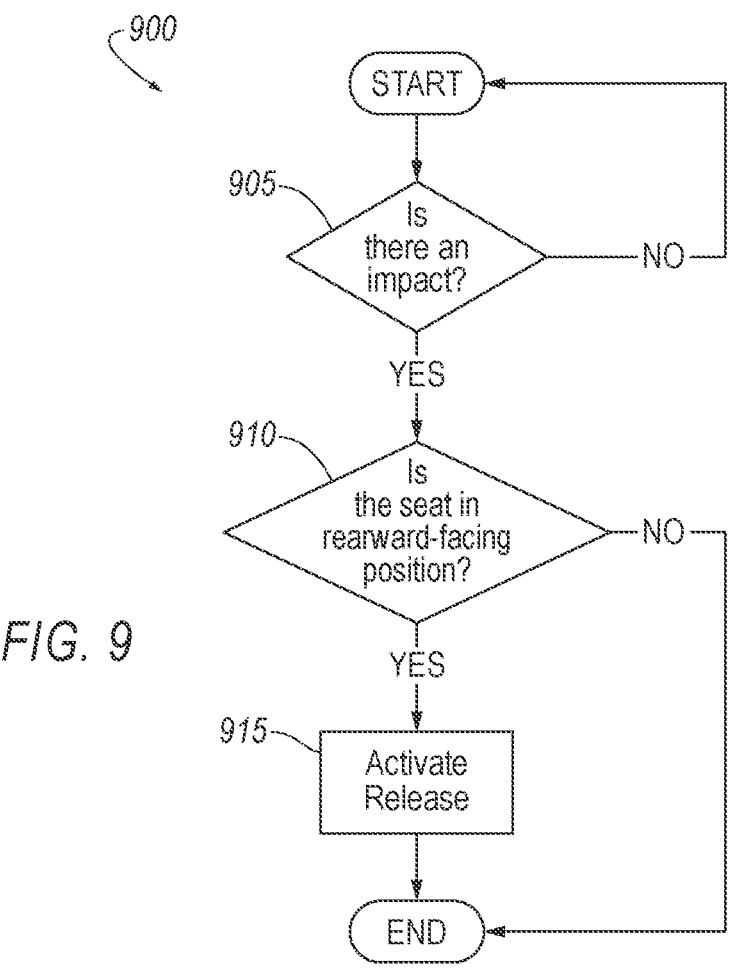
FIG. 9 is a flowchart showing instructions executable by a computer of the vehicle.

With reference to FIG. 9, the vehicle computer 46 stores instructions to control components of the vehicle 12 according to the method 900 shown in FIG. 9. Specifically, as shown in FIG. 9, the vehicle computer 46 determines whether one or more of the seats 30 is in the rearward-facing position. The vehicle computer 46 may perform the method 900 for each seat 30 in the vehicle 12 to individually control components of the vehicle 12. "In response to" and "based on" are used throughout this text to indicate a causal relationship, not merely a temporal relationship. For example, the vehicle computer 46 controls components of the vehicle 12 as a direct result of determining whether one or more of the seats 30 is in the rearward-facing position.

With reference to decision block 905, the method includes determining whether there is an impact to the vehicle 12. The impact sensors 48 may identify whether there has been an impact to the vehicle 12 by sending a signal to the vehicle computer 46 to indicate the impact. If there is no impact to the vehicle 12, the method begins again at the start.

With reference to decision block 910, the seat orientation sensors 64 may send a signal to the vehicle computer 46 indicating the orientation of one or more seats 30. If the seat 30 is determined to be in the forward-facing position, the method 900 ends.

With reference to block 915, if the seats 30 are determined to be in the rearward-facing position, the vehicle computer 46 may send a signal to the release 26 of the assembly 10 to deploy the second plate 18 to the deployed position. In such an example, the second plate 18 may support the seatback 32 of the seat 30 in this position. In an example as shown in FIG. 6, the vehicle computer 46 may send a signal to the solenoid 56 to release 26 the spiral spring 54. In an example as shown in FIG. 7, the vehicle computer 46 may send a signal to activate the pyrotechnic device 62.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle comprising:
   a dash;
   a first plate fixed to the dash;
   a second plate movable along an axis away from the first plate from an undeployed position to a deployed position;
   a spring between the first plate and the second plate and biasing the second plate toward the deployed position;
   a post extending along the axis from the second plate through the first plate;
   a pin releasably engaging the post with the first plate in the undeployed position; and
   a release supported by the first plate and connected to the pin, the pin being disengageable from the post transverse to the axis by the release.

2. The vehicle of claim 1, wherein the release includes a cap that is spring-loaded and connected to the pin, the cap being rotatable relative to the first plate.

3. The vehicle of claim 2, wherein the release includes a cable extending from the cap to the pin.

4. The vehicle of claim 2, wherein the release includes a solenoid releasably engageable with the cap.

5. The vehicle of claim 1, wherein the release includes a cap connected to the pin and a pyrotechnic device engaged with the cap and designed to rotate the cap.

6. The vehicle of claim 1, further comprising a second post spaced from the post, the second post extending along the axis from the second plate through the first plate, and a second pin releasably engaging the second post with the first plate in the undeployed position, the second pin being disengageable from the second post transverse to the axis by the release.

7. The vehicle of claim 1, further comprising a second spring between the first plate and the second plate and spaced from the spring, the second spring biasing the second plate toward the deployed position.

8. The vehicle of claim 1, wherein the first plate is between the pin and the second plate in the undeployed position.

9. The vehicle of claim 1, further comprising a cable extending from the release to the pin, the cable being movable by the release.

10. The vehicle of claim 1, wherein the pin abuts the first plate in the undeployed position.

11. The vehicle of claim 1, further comprising a seat movable from a forward-facing position to a rearward-facing position, the seat including a seatback defining an occupant seating area of the seat, the seatback being between the second plate and the occupant seating area when the seat is in the rearward-facing position.

12. An assembly comprising:
a first plate;
a second plate movable along an axis away from the first plate from an undeployed position to a deployed position;
a spring between the first plate and the second plate and biasing the second plate toward the deployed position;
a post extending along the axis from the second plate through the first plate;
a pin releasably engaging the post with the first plate in the undeployed position; and
a release supported by the first plate and connected to the pin, the pin being disengageable from the post transverse to the axis by the release.

13. The assembly of claim 12, wherein the release includes a cap that is spring-loaded and connected to the pin, the cap being rotatable relative to the first plate.

14. The assembly of claim 13, wherein the release includes a cable extending from the cap to the pin.

15. The assembly of claim 13, wherein the release includes a solenoid releasably engageable with the cap.

16. The assembly of claim 12, wherein the release includes a cap connected to the pin and a pyrotechnic device engaged with the cap and designed to rotate the cap.

17. The assembly of claim 12, further comprising a second post spaced from the post, the second post extending along the axis from the second plate through the first plate, and a second pin releasably engaging the second post with the first plate in the undeployed position, the second pin being disengageable from the second post transverse to the axis by the release.

18. The assembly of claim 12, further comprising a second spring between the first plate and the second plate and spaced from the spring, the second spring biasing the second plate toward the deployed position.

19. The assembly of claim 12, wherein the first plate is between the pin and the second plate in the undeployed position.

20. The assembly of claim 12, wherein the pin abuts the first plate in the undeployed position.

* * * * *